(12) United States Patent
Vega et al.

(10) Patent No.: US 11,787,299 B2
(45) Date of Patent: Oct. 17, 2023

(54) EJECTOR FOR ELECTRIC VEHICLE CHARGING CONNECTORS

(71) Applicant: EVject, Inc., American Fork, UT (US)

(72) Inventors: Erick Vega, Salt Lake City, UT (US); Preston Ruff, Draper, UT (US); Kreg Peeler, Draper, UT (US)

(73) Assignee: EVject, Inc., American Fork, UT (US)

( * ) Notice: Subject to any disclaimer, the term of this patent is extended or adjusted under 35 U.S.C. 154(b) by 28 days.

(21) Appl. No.: 17/565,107

(22) Filed: Dec. 29, 2021

(65) Prior Publication Data

US 2023/0158903 A1 May 25, 2023

Related U.S. Application Data

(60) Provisional application No. 63/282,671, filed on Nov. 23, 2021.

(51) Int. Cl.
| | |
|---|---|
| *H01R 13/639* | (2006.01) |
| *B60L 53/16* | (2019.01) |
| *H01R 13/635* | (2006.01) |
| *H01R 13/633* | (2006.01) |

(52) U.S. Cl.
CPC ............ *B60L 53/16* (2019.02); *H01R 13/635* (2013.01); *H01R 13/639* (2013.01); *H01R 13/6335* (2013.01); *H01R 2201/26* (2013.01)

(58) Field of Classification Search
CPC ... B60L 53/16; H01R 13/6335; H01R 13/635; H01R 2201/26
See application file for complete search history.

(56) References Cited

U.S. PATENT DOCUMENTS

| | | | | |
|---|---|---|---|---|
| 5,383,790 A | * | 1/1995 | Kerek | H01R 13/635 439/248 |
| 5,645,439 A | | 7/1997 | Nugent, Jr. et al. | |
| 5,800,189 A | * | 9/1998 | Ahmed | H01R 13/7132 439/923 |
| 8,968,021 B1 | * | 3/2015 | Kennedy | H01R 13/641 439/352 |

(Continued)

FOREIGN PATENT DOCUMENTS

| | | | |
|---|---|---|---|
| DE | 102019106282 A1 | 9/2020 | |
| KR | 452236 * | 2/2011 | H01R 13/71 |

(Continued)

OTHER PUBLICATIONS

International Searching Authority, International Search Report and the Written Opinion, dated Mar. 8, 2023.

*Primary Examiner* — Truc T Nguyen
(74) *Attorney, Agent, or Firm* — KIRTON MCCONKIE; Brian Tucker

(57) ABSTRACT

An ejector for electric vehicle charging connectors is provided. An ejector can be configured to be secured on the inside of the charging port of an EV and to automatically eject or push the charging connector from the charging port. The ejector may include a pusher assembly that selectively extends through an opening in a housing forming the socket of the charging port. The ejector may also include a driver assembly that forces the pusher assembly through the opening to eject the charging connector while allowing the pusher assembly to be freely withdrawn when the charging connector is inserted.

18 Claims, 12 Drawing Sheets

(56) References Cited

U.S. PATENT DOCUMENTS

| | | |
|---|---|---|
| 10,454,212 B2 | 10/2019 | Nugent, Jr. |
| 2013/0078839 A1* | 3/2013 | Musk .................. H01R 13/631 |
| | | 439/345 |
| 2014/0162481 A1* | 6/2014 | Han ..................... H01R 13/635 |
| | | 439/152 |
| 2018/0201145 A1* | 7/2018 | Yellambalase .......... B60L 53/60 |
| 2021/0006010 A1* | 1/2021 | Schreiber ................ B60L 53/16 |
| 2021/0086640 A1 | 3/2021 | Cole et al. |

FOREIGN PATENT DOCUMENTS

| | | | | |
|---|---|---|---|---|
| KR | 200452236 | * | 2/2011 | ............ H01R 13/71 |
| WO | 2006081820 A1 | | 8/2006 | |

* cited by examiner

EJECTOR FOR ELECTRIC VEHICLE CHARGING CONNECTORS

CROSS-REFERENCE TO RELATED APPLICATIONS

This application claims the benefit of U.S. Provisional Patent Application No. 63/282,671 which was filed on Nov. 23, 2021.

BACKGROUND

Electric vehicles (or EVs), whether cars, trucks or otherwise, must be frequently recharged. For this purpose, EVs have charging ports that are typically located on the side of the EV. FIGS. 1A and 1B provide an example of a Tesla 100 that has a charging port 110 into which a charging connector 120 can be plugged. Charging connector 120 can be electrically connected to a power source such as a 240-volt outlet at home or a public charging station. Other makes of EVs have similar charging ports that require similar charging connectors.

Charging port 110 may be formed of an outer cover 111 that forms an opening that exposes an internal housing 112 which forms a socket 113. Charging connector 120 is physically inserted into socket 113 to form the necessary electrical connections. FIGS. 1C and 1D are isolated external and internal views respectively of charging port 110 when outer cover 111 is removed. As is visible in FIG. 1D, a contact housing 115 may be secured to internal housing 112 surrounding socket 113 and may include the electrical contacts for forming the electrical connection. Wires 114 may connect the contacts of contact housing 115 to the battery of Tesla 100. Although this example is specific to Tesla 100, similar charging port configurations are employed on other types of EVs.

It can take a relatively long time to fully charge an EV. For example, with a typical 240-volt at-home charger, a full charge may take 8 hours. Even with high-voltage superchargers, it usually takes at least 30-40 minutes to reach a full charge.

Most EVs are designed to prevent any motion of the EV while the EV is connected to a charger. Therefore, the vehicle must remain parked while connected to the charger and cannot be shifted to drive, reverse, or neutral. Additionally, current charger designs require manual removal of the charging connector from the charging port. This can create various difficulties. For example, if a driver is in a rush to leave, he or she may forget to unplug the charger before getting into the EV. Similarly, if a driver's hands are full, he or she may have difficulty removing the charging connector from the charging port and managing the storage of the charging cable.

Greater difficulties may arise in scenarios where the driver is waiting in the EV while it charges. For example, a thunderstorm or other severe weather could occur when charging is complete thus forcing the driver to brave the elements to unplug the EV. As another example, a charging station may be in a remote or dangerous location where it may be unsafe for the driver to exit the EV such as due to the presence of wildlife or a lurking assailant. In such cases, the driver will in essence be trapped inside the EV given that he or she cannot drive away until the EV is unplugged.

BRIEF SUMMARY

The present invention extends to an ejector for electric vehicle charging connectors. An ejector can be configured to be secured on the inside of the charging port of an EV and to automatically eject or push the charging connector from the charging port. The ejector may include a pusher assembly that selectively extends through an opening in a housing forming the socket of the charging port. The ejector may also include a driver assembly that forces the pusher assembly through the opening to eject the charging connector while allowing the pusher assembly to be freely withdrawn when the charging connector is inserted.

In some embodiments, the present invention may be implemented as an ejector that includes one or more pusher assemblies that are configured to push a connector from a socket, and one or more driver assemblies that are configured to force the one or more pusher assemblies against the connector to push the connector from the socket and to freely retract when the connector is inserted into the socket.

In some embodiments, each of the one or more pusher assemblies includes a pusher and a shaft.

In some embodiments, the shaft forms a rack of a rack and pinion.

In some embodiments, each of the one or more driver assemblies forms a pinion of the rack and pinion.

In some embodiments, the pusher extends through an opening in a housing that forms the socket.

In some embodiments, each of the one or more driver assemblies includes a motor, a gear assembly, and a freewheel assembly.

In some embodiments, the freewheel assembly includes an inner component, an outer component, and one or more pawls. The one or more pawls may allow the outer component to rotate relative to the inner component to allow the corresponding pusher assembly to freely retract.

In some embodiments, the gear assembly includes a gear arrangement that is supported by a plate assembly.

In some embodiments, the gear arrangement includes a center gear component, a first side gear component, and a second side gear component.

In some embodiments, the plate assembly includes a first plate, a second plate, and a third plate.

In some embodiments, the one or more pusher assemblies comprise two pusher assemblies and the one or more driver assemblies comprise two driver assemblies.

In some embodiments, the present invention may be implemented as an ejector for a charging port of an electric vehicle. The ejector may include a housing that is configured to be secured around a socket of the charging port. The ejector may also include one or more pusher assemblies that are supported by the housing. Each of the one or more pusher assemblies may include a pusher and a shaft. The pusher may be configured to extend through an opening within the socket of the charging port. The ejector may further include one or more driver assemblies that are coupled to the one or more pusher assemblies. Each of the one or more driver assemblies may include a freewheel assembly that forces the pusher through the opening within the socket.

In some embodiments, the freewheel assembly allows the pusher to be freely retracted when a charging connector is inserted into the socket.

In some embodiments, the freewheel assembly forms a pinion and the shaft forms a rack.

In some embodiments, the ejector may also include circuitry for receiving a signal and, in response to receiving the signal, causing each of the one or more driver assemblies to force the respective pusher through the opening within the socket.

In some embodiments, the signal is received via a wired connection or a wireless connection.

In some embodiments, the present invention may be implemented as an ejector that includes a housing that is configured to be secured around a socket of a charging port. The ejector may also include a pusher assembly that is supported by the housing. The pusher assembly may be configured to selectively extend through an opening within a socket of the charging port. The ejector may further include a driver assembly that is configured to force the pusher assembly through the opening in response to a signal. The driver assembly may also be configured to allow the pusher assembly to be freely pushed into the opening when a charging connector is inserted into the socket.

In some embodiments, the driver assembly may include a freewheel assembly.

In some embodiments, the pusher assembly includes a shaft that forms a rack and the freewheel assembly forms a pinion.

In some embodiments, the ejector may further include a second pusher assembly that is supported by the housing. The second pusher assembly may be configured to selectively extend through a second opening within the socket of the charging port. The ejector may further additionally include a second driver assembly that is configured to force the second pusher assembly through the second opening in response to the signal. The second driver assembly may also be configured to allow the second pusher assembly to be freely pushed into the second opening when the charging connector is inserted into the socket.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention encompass ejectors that are configured to enable the driver (or other user) to automatically eject (or remove) the charging connector from the charging port of an EV. As a result, the driver need not exit the EV or be present at the EV to eject the charging connector. Any suitable mechanism could be used to communicate with the ejector to cause it to eject the charging connector including any wired or wireless connection. In some embodiments, a communication mechanism may be integrated into the EV. In other embodiments, a separate device, such as a mobile application or fob, may be used to communicate with the ejector.

Figure 1A:
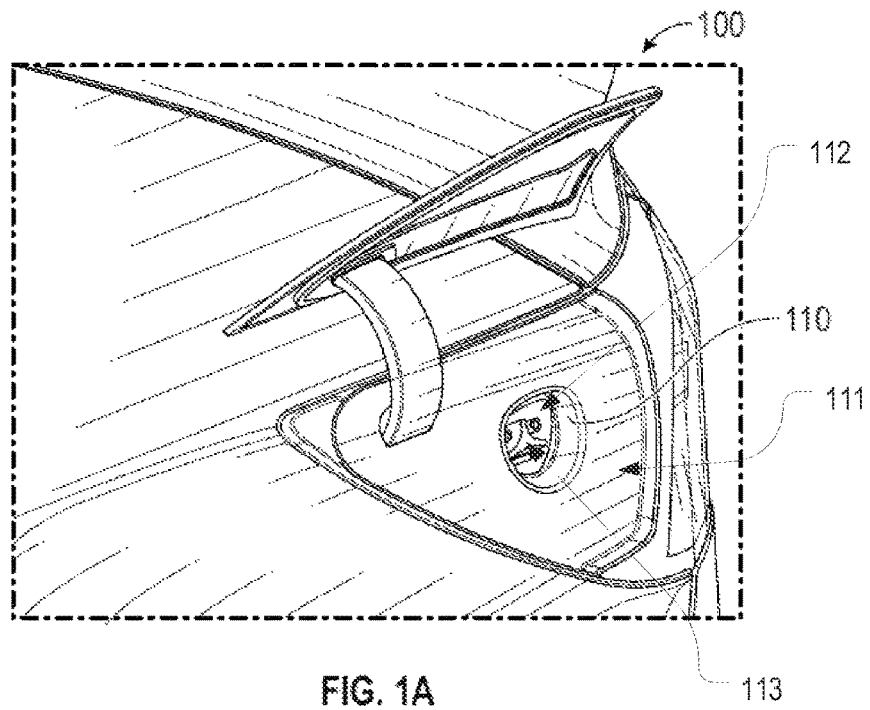
FIGS. 1A-1D provide an example of an electric vehicle charging system with which an ejector configured in accordance with embodiments of the present invention may be used.
Figure 1B:
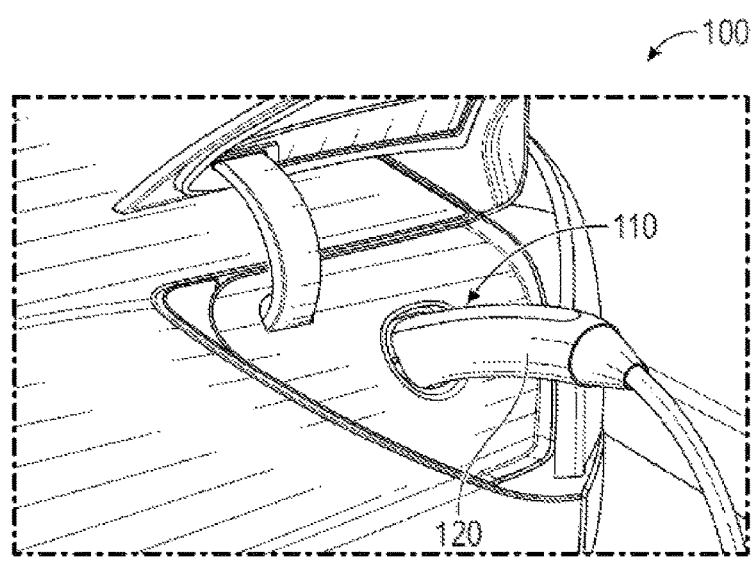
Figure 1C:
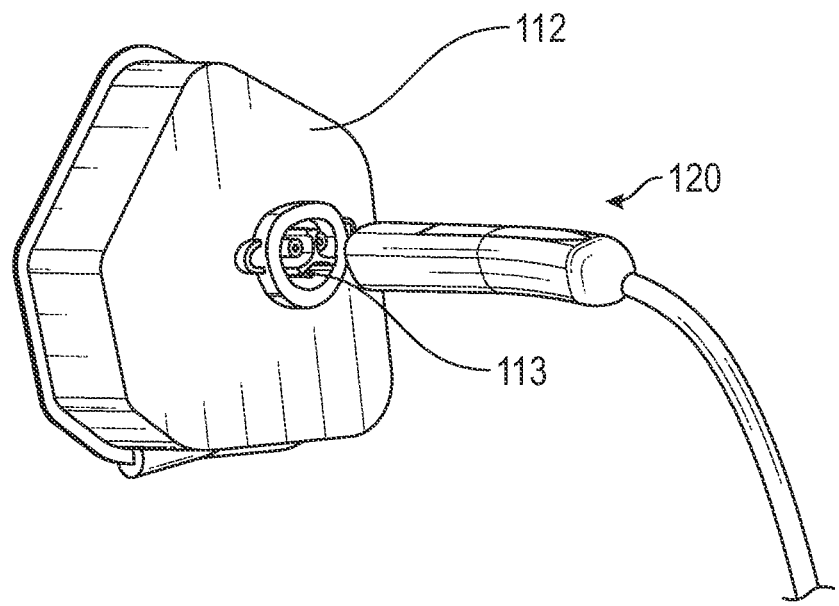
Figure 1D:
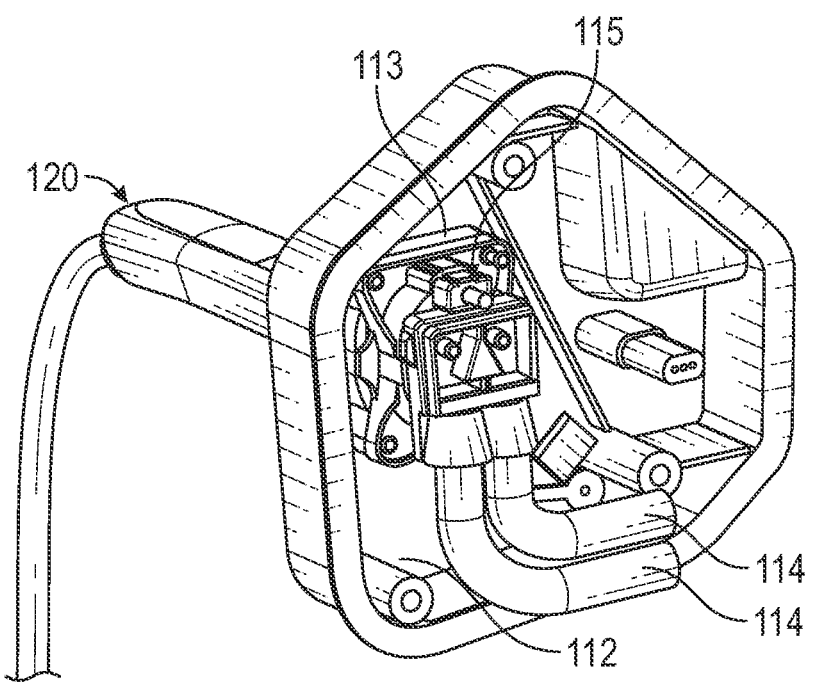
Figure 2:
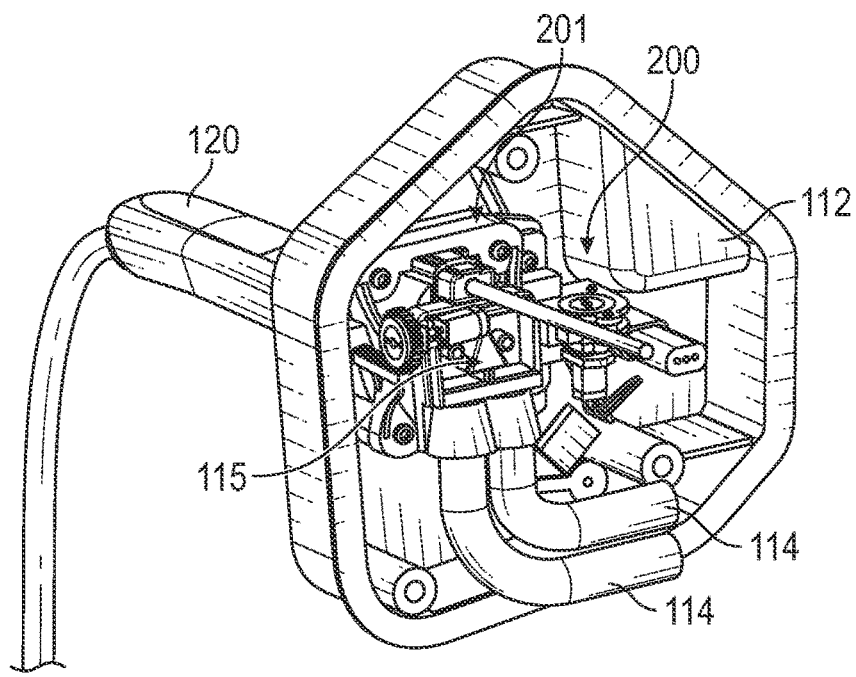
FIG. 2 provides an example of how an ejector configured in accordance with embodiments of the present invention may be integrated into the electric vehicle charging system shown in FIGS. 1A-1D.
Figure 2A:
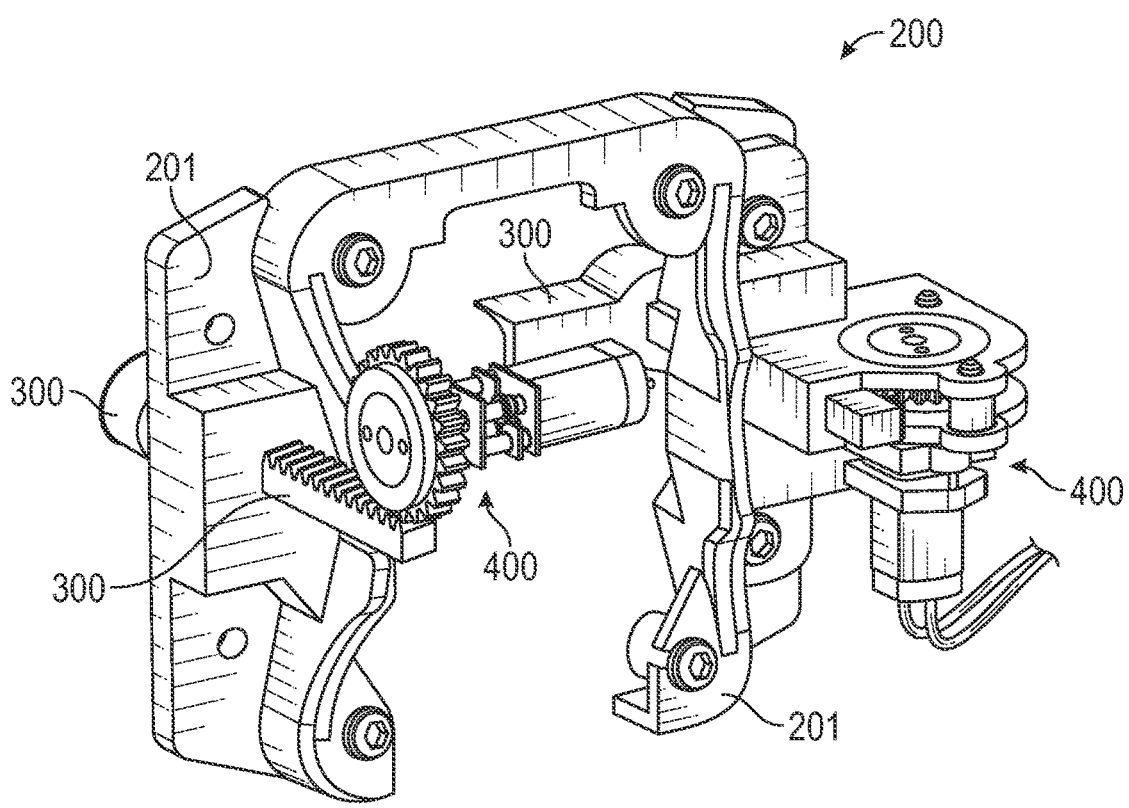
FIGS. 2A-2E are rear perspective, front perspective, top, left-side, and right-side views respectively of the ejector of FIG. 2 in isolation.
Figure 2B:
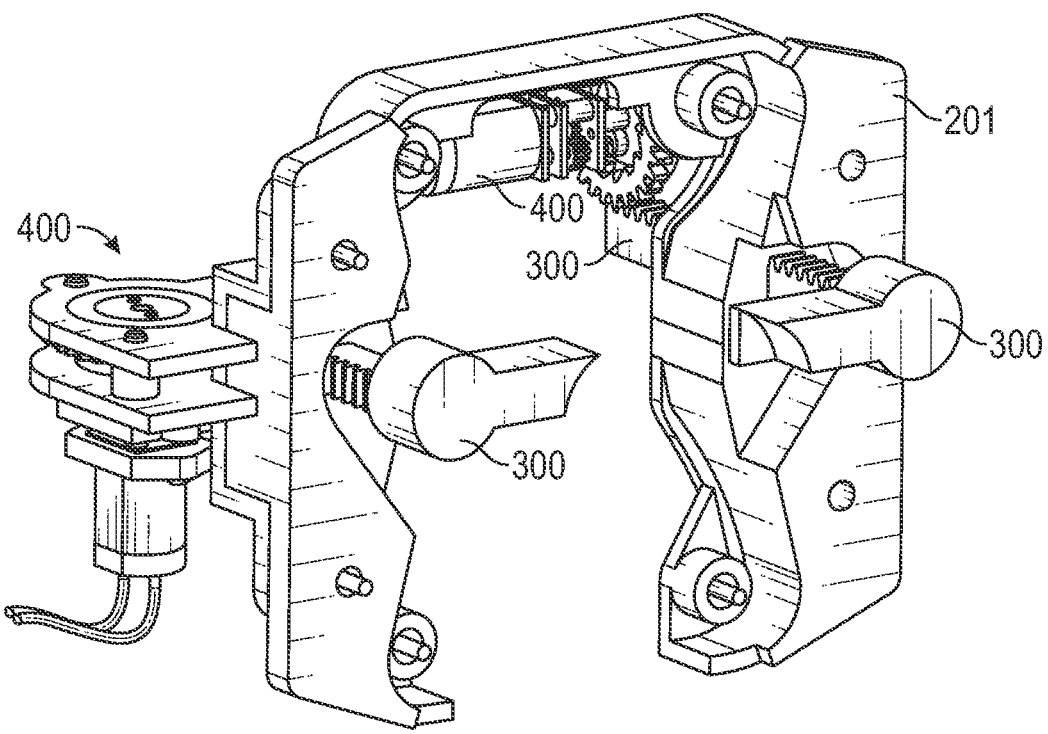
Figure 2C:
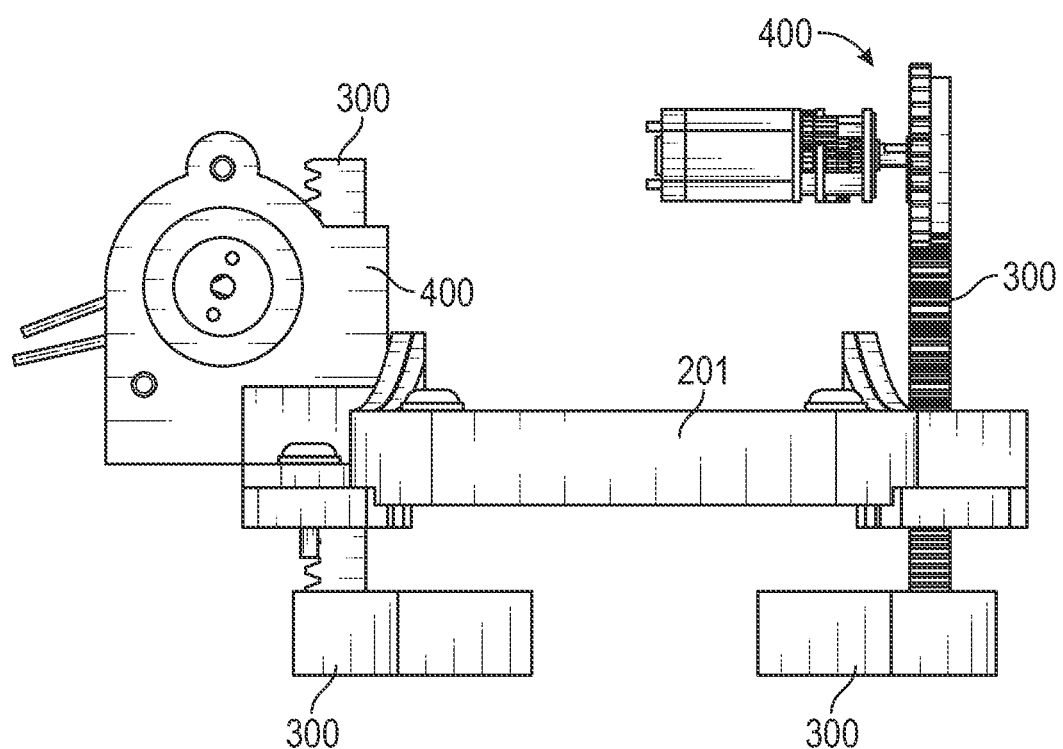
Figure 2D:
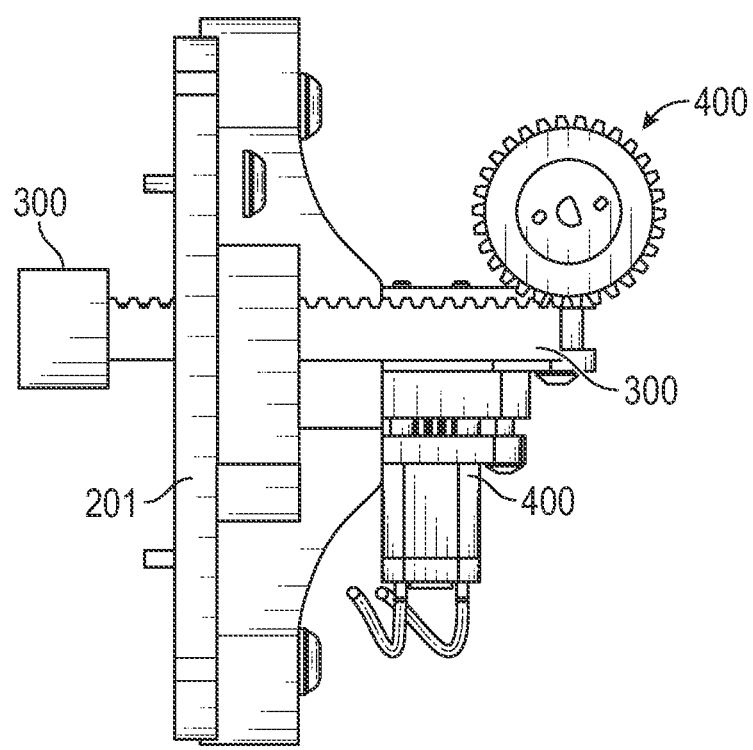
Figure 2E:
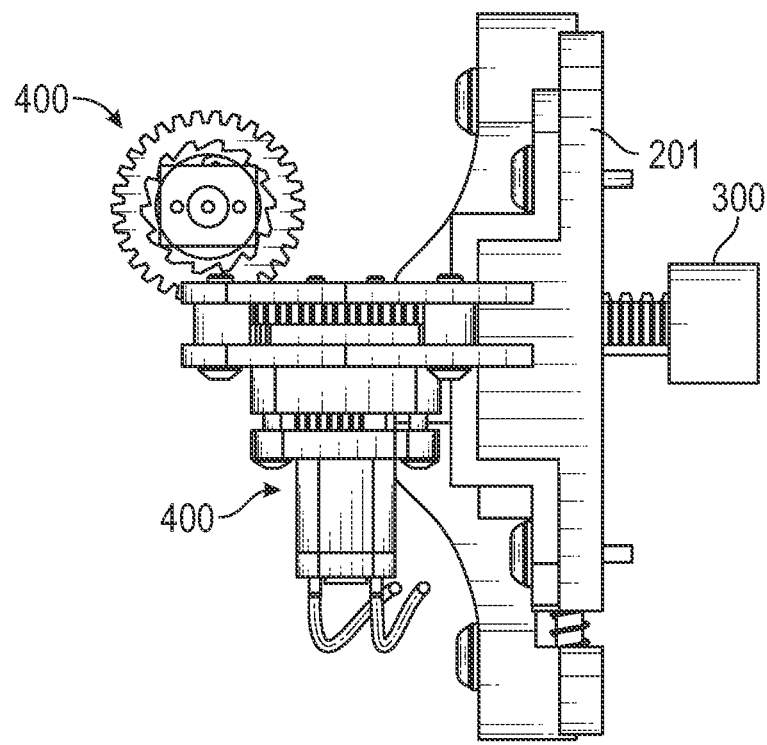

FIG. 2 shows an example of an ejector 200 that is configured in accordance with embodiments of the present invention when it is secured to internal housing 112 of charging port 110 of Tesla 100. It is noted, however, that ejector 200 could be used with a charging port of any other EV. Also, an ejector configured in accordance with embodiments of the present invention could be used to eject other types of connectors, and therefore, embodiments of the present invention should not be limited to charging port scenarios.

Ejector 200 includes a housing 201 that is configured to be coupled or mounted to the inside of internal housing 112 and surrounds or is adjacent to socket 113 and contact housing 115 and can accommodate wires 114. Housing 201 could be secured to internal housing 112 or to any other component of a charging port in any suitable manner including by screws, welding, an adhesive, etc. For example, the front of housing 201 could be positioned against internal housing 112 and secured thereto via one or more screws.

FIGS. 2A-2E are rear perspective, front perspective, top, left-side, and right-side views respectively of ejector 200 in isolation. As shown, ejector 200 may include one or more pusher assemblies 300 (two are included in the depicted embodiment) and one or more driver assemblies 400 (two are included in the depicted embodiment).

As an overview, each pusher assembly 300 is configured to be freely pushed inwardly when charging connector 120 is inserted into socket 113. Each driver assembly 400 is configured to interface with a corresponding pusher assembly 300 to force it outwardly against charging connector 120 to thereby eject charging connector 120 from charging port 110. As in the depicted embodiment, it may be preferable to include a pair of pusher assemblies 300 positioned on opposing sides of socket 113 so that they may apply an evenly distributed force on opposing sides of charging connector 120. However, in some embodiments, a single pusher assembly 300 could be sufficient to force a charging connector 120 from a charging port.

Figure 3:
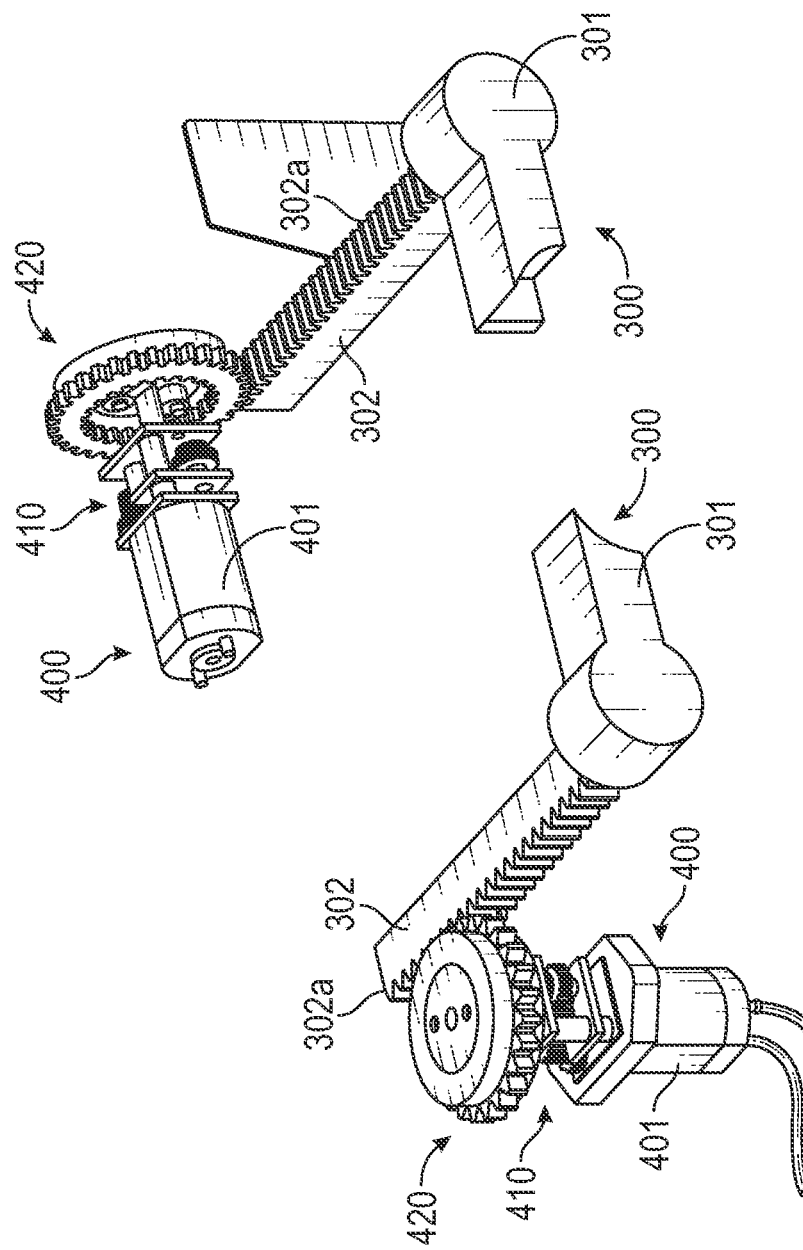
FIG. 3 illustrates pusher assemblies and driver assemblies of the ejector of FIG. 2 in isolation.

FIG. 3 is a front perspective view of pusher assemblies 300 and driver assemblies 400 in isolation. Each pusher assembly 300 may include a pusher 301 that is connected to a shaft 302. Pushers 301 may be configured to extend through internal housing 112 so that they may contact charging connector 120 when charging connector 120 is inserted into socket 113. Each shaft 302 may include gears 302a that function as the rack of a rack and pinion.

Each driver assembly 400 may include a motor 401, a gear assembly 410 and a freewheel assembly 420. Motor 401 can apply a rotational force to gear assembly 410 which in turn can rotate freewheel assembly 420. Each freewheel assembly 420 may form the pinion of the rack and pinion and may therefore be interfaced with shaft 302 to cause pusher assembly 300 to move linearly in response to motor 401's rotational force. As represented in the figures, driver assemblies 400 may be in different orientations (e.g., horizontal and vertical) so that they may fit within the limited space behind internal housing 112. However, driver assemblies 400, and therefore the gears 302a of shafts 302, could be in any suitable orientation for a particular EV's configuration.

Figure 4A:
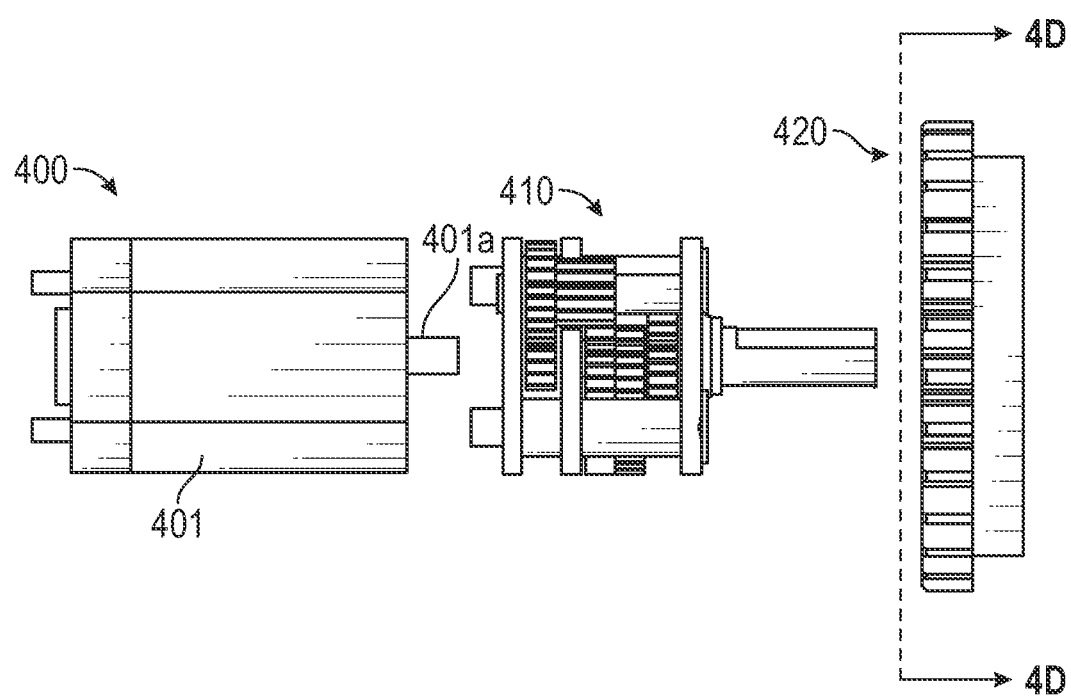
FIG. 4A is an exploded view of a driver assembly.

FIG. 4A is an exploded view of a driver assembly 400. As shown, motor 401 includes a shaft 401a that delivers a rotational force to gear assembly 410. Gear assembly 410 is configured to increase this rotational force for delivery to freewheel assembly 420.

Figure 4B:
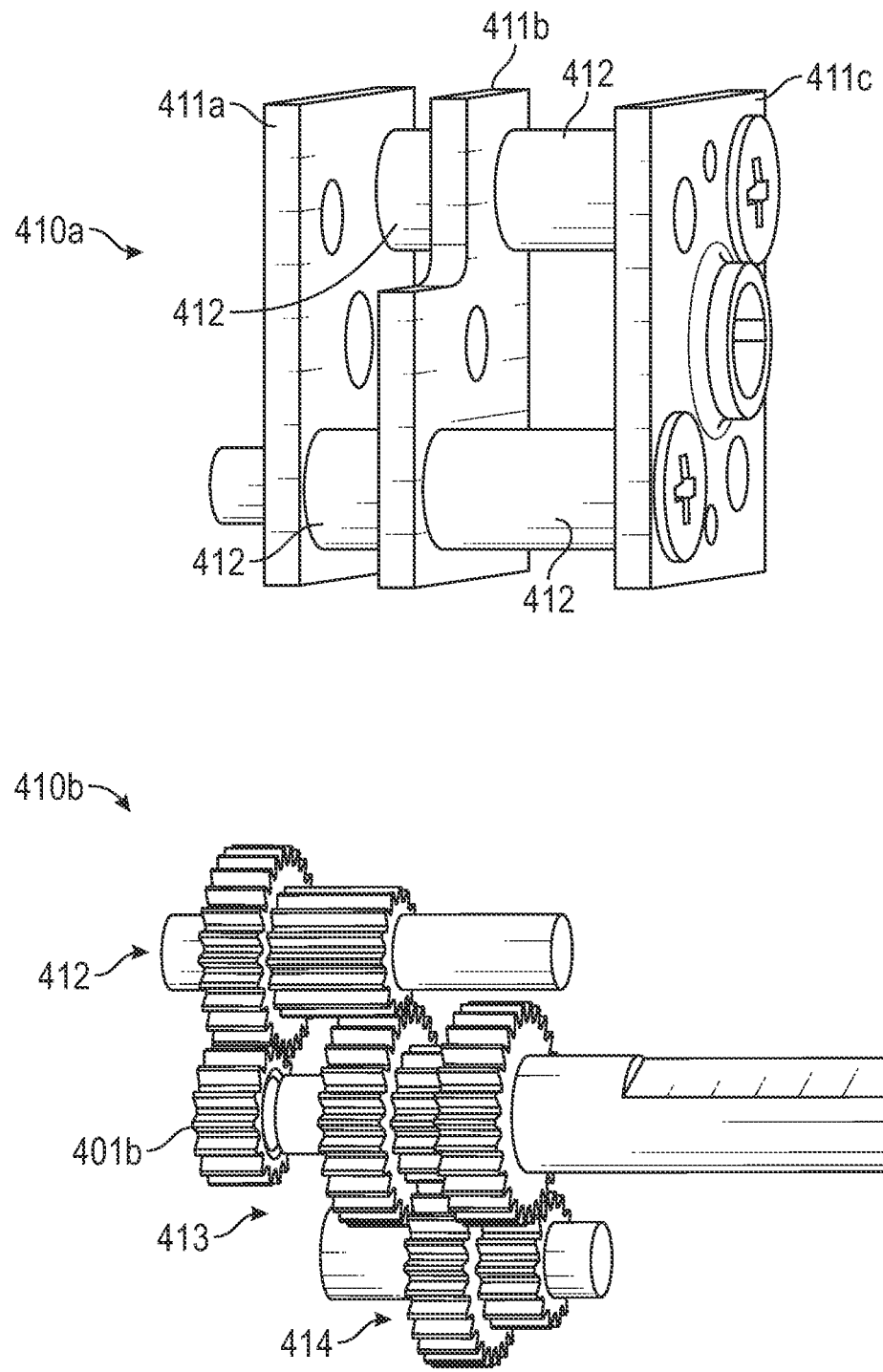
FIG. 4B is an exploded view of a gear assembly of a driver assembly.

As shown in FIG. 4B, gear assembly 410 includes a gear arrangement 410b that is supported within a plate assembly 410a. Plate assembly 410a includes a first plate 411a, a second plate 411b, and a third plate 411c. First plate 411a may be spaced apart from second plate 411b by spacers 411d. Second plate 411b may also be spaced apart from third plate 411c by spacers 411d. First plate 411a, second plate 411b, and third plate 411c may include aligned holes for accommodating and securing gear arrangement 410b and screws for mounting gear assembly 410 to a housing of motor 401.

Gear arrangement 410b includes a motor gear 401b that is secured to shaft 401a of motor 401, a first side gear component 412, a center gear component 413, and a second side gear component 414. First side gear component 412 and second side gear component 414 may be positioned on opposing sides of center gear component 413. More specifically, first plate 411a and third plate 411c may position first side gear component 412 on one side of center gear component 413, and second plate 411b and third plate 411c may position second side gear component 414 on the opposite side of center gear component 413. In this way, first side gear component 412 and second side gear component 414 can assist in retaining the orientation of center gear component 413 while delivering rotational force to center gear component 413.

Figure 4C:
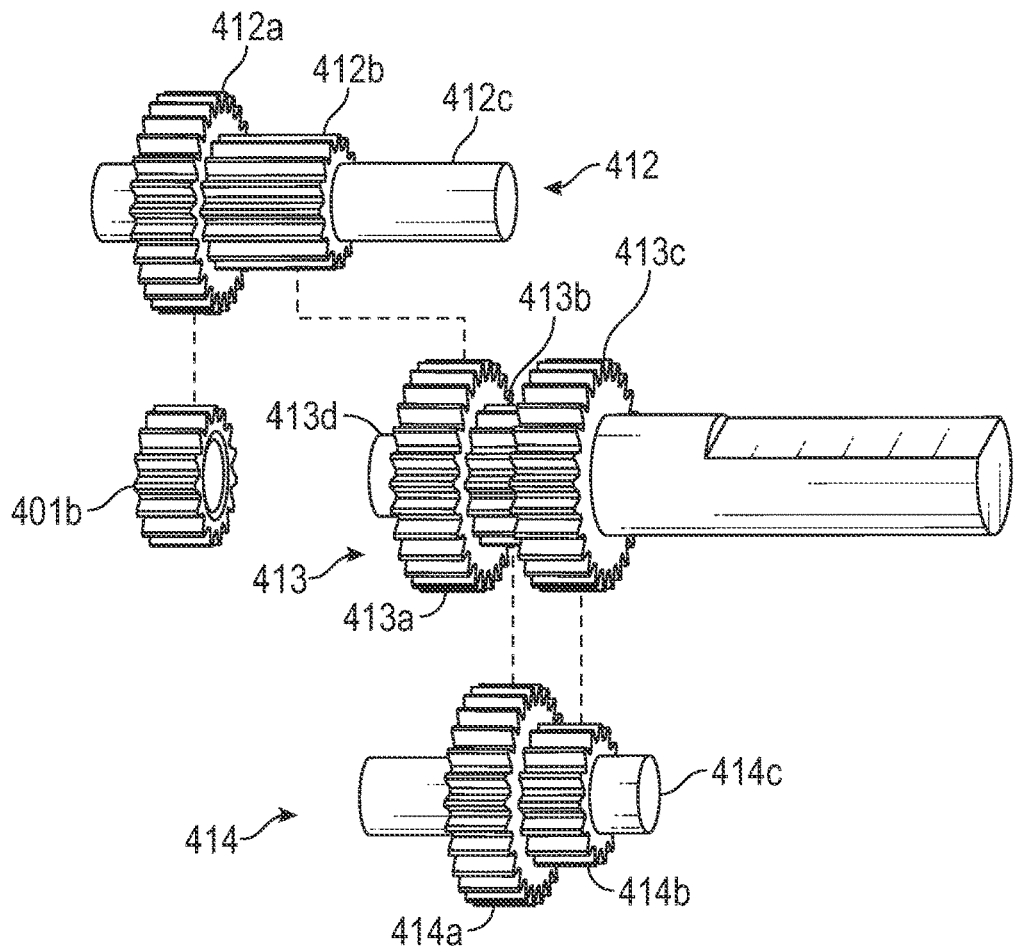
FIG. 4C is an exploded view of the gears of the gear assembly of FIG. 4B.

As is best illustrated in FIG. 4C, motor gear 401b may drive a first gear 412a formed on shaft 412c of first side gear component 412. A second gear 412b formed on shaft 412c of first side gear component 412 may be geared to a first gear 413a formed on shaft 413d of center gear component 413. A second gear 413b and a third gear 413c may also be formed on shaft 413d of center gear component 413 and may be geared to a first gear 414a and a second gear 414b respectively formed on shaft 414c of second side gear component 414. Shaft 413d of center gear component 413 may extend from third gear 413c and may be keyed to freewheel assembly 420.

Figure 4D:
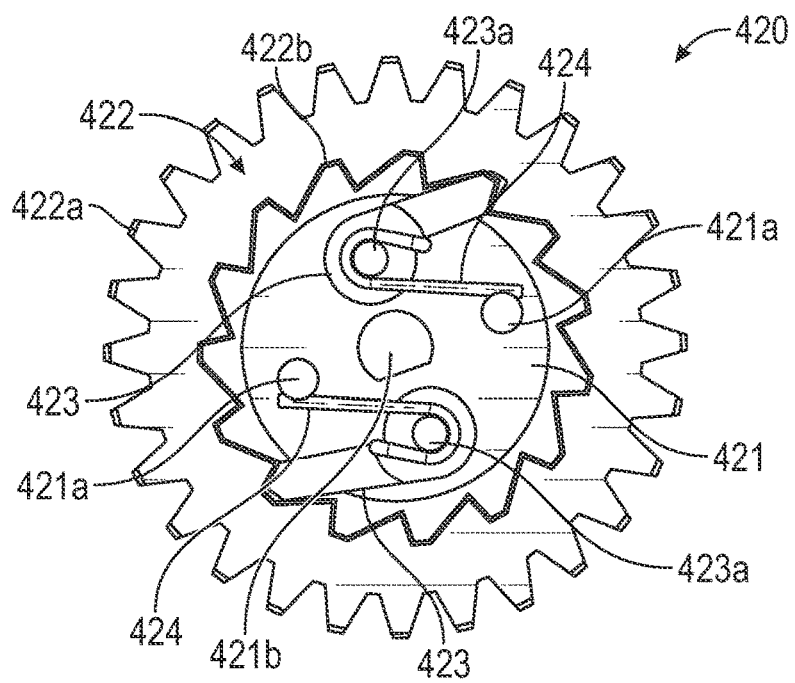
FIG. 4D shows a freewheel assembly of the driver assembly.

FIG. 4D shows freewheel assembly 420 from the perspective indicated in FIG. 4A. Freewheel assembly 420 includes an inner component 421 and an outer component 422 that are coupled together in a manner that allows them to rotate relative to one another. Inner component 421 includes an opening 421b for receiving shaft 413d and is therefore rotated by shaft 413d. Outer component 422 forms an outer gear 422a that functions as the pinion referenced above. Outer component 422 also forms inner teeth 422b that interface with pawls 423 that are secured to inner component 421 at a pivot point 423a. Springs 424 may be positioned between a post 421a and pivot point 423a to bias pawls 423 against inner teeth 422b.

From the perspective in FIG. 4D, pawls 423 will allow outer component 422 to rotate in a clockwise direction relative to inner component 421 which would correspond with inward (or right-to-left) movement of shaft 302. In contrast, when motor 401 drives freewheel assembly 420 in a counterclockwise direction, pawls 423 will engage with inner teeth 422b to cause inner component 421 and outer component 422 to rotate together thereby causing shaft 302 to be driven outwardly.

Figure 5A:
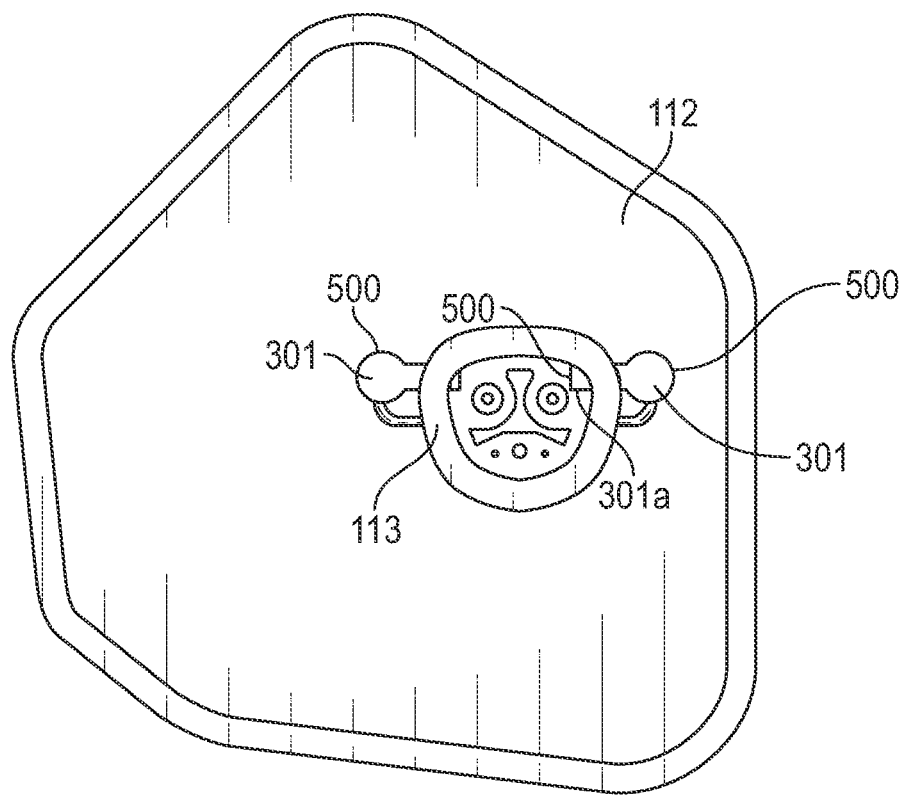
FIG. 5A is a front view of the electric vehicle charging system of FIGS. 1A-1D when the ejector of FIG. 2 is in an extended position.
Figure 5B:
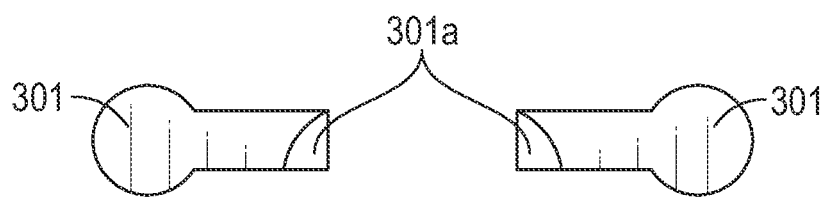
FIG. 5B shows the pushers of the pusher assemblies in isolation to represent how they may be adapted to the socket of the electric vehicle charging station.

FIG. 5A is a front view of internal housing 112 when pushers 301 have been extended outwardly through internal housing 112. In other words, FIG. 5A can represent the state of ejector 200 after it has ejected charging connector 120. As shown, openings 500 can be formed in internal housing 112 to enable pushers 301 to extend therethrough. Openings 500 can extend within socket 113 so that pushers 301 will contact charging connector 120 when charging connector 120 is inserted into socket 113.

In some embodiments, openings 500 can extend frontwardly into the structure of socket 113 so that pushers 301 may extend frontwardly beyond internal housing 112. In such embodiments, pusher 301 may include a recessed inner portion 301a that has a shape matching the shape of the structure of socket 113. Recessed inner portion 301a may substantially align with the surface of internal housing 112 within socket 113 when the remainder of pusher 301 extends beyond the surface of internal housing 112. Openings 500, and specifically the portion of openings 500 that extends through the structure of socket 113, can function as a stop for pusher 301. In other words, pusher 301 can contact the structure of socket 113 to limit its frontward movement.

Figure 6A:
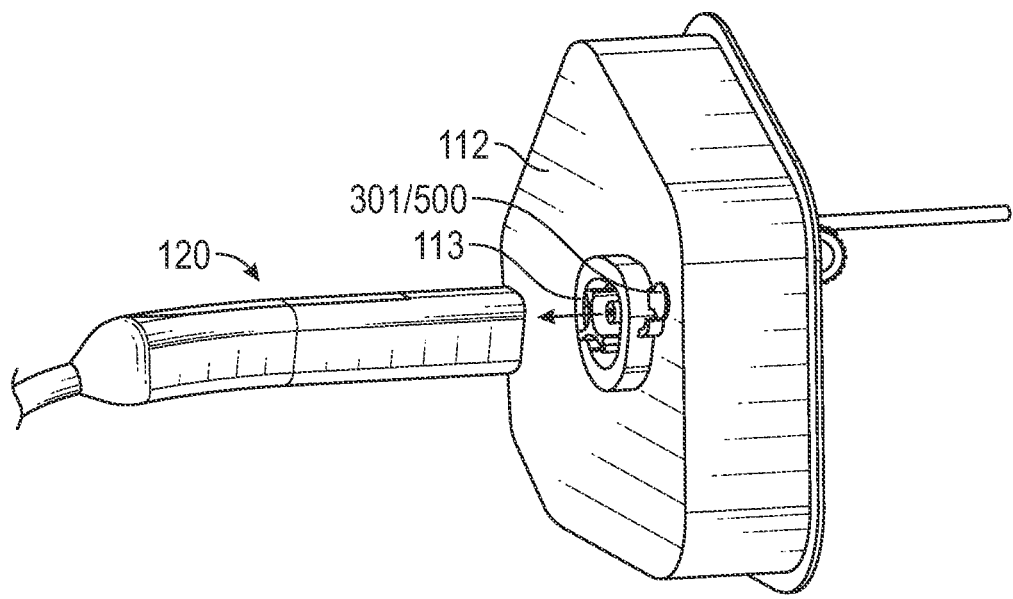
FIGS. 6A and 6B are front perspective and side views respectively representing the state of the ejector immediately after the charging connector is ejected.
Figure 6B:
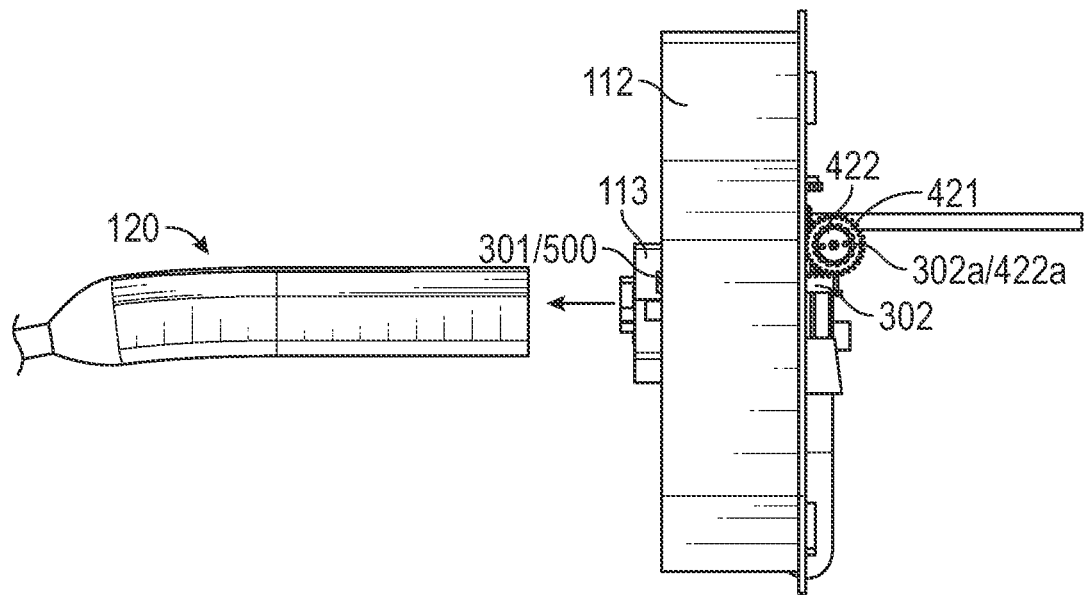

FIGS. 6A and 6B are front perspective and side views respectively representing the state of ejector after it has ejected charging connector 120 from socket 113. As shown, pushers 301 are extending into and through openings 500. This can be accomplished by driving motor 401 to cause outer component 422 to rotate, which in turn causes outer gear 422a to push gear 302a so that shaft is moved frontwardly. As stated above, motor 401 could be driven in response to any suitable signal or other input.

Figure 7A:
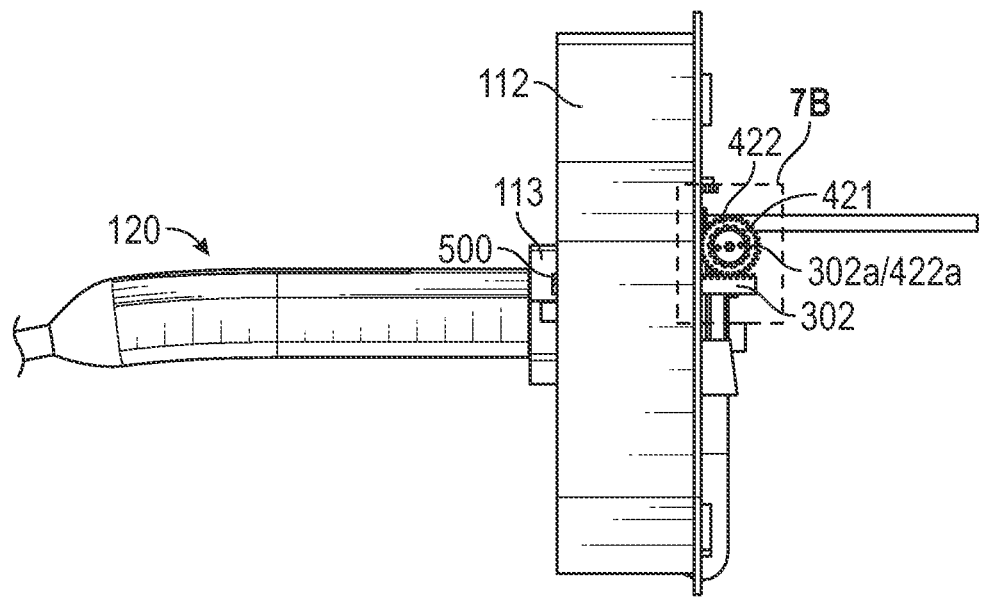
FIGS. 7A and 7B are side and detailed side views respectively representing the state of the ejector when the charging connector is inserted into the charging port of the EV.
Figure 7B:
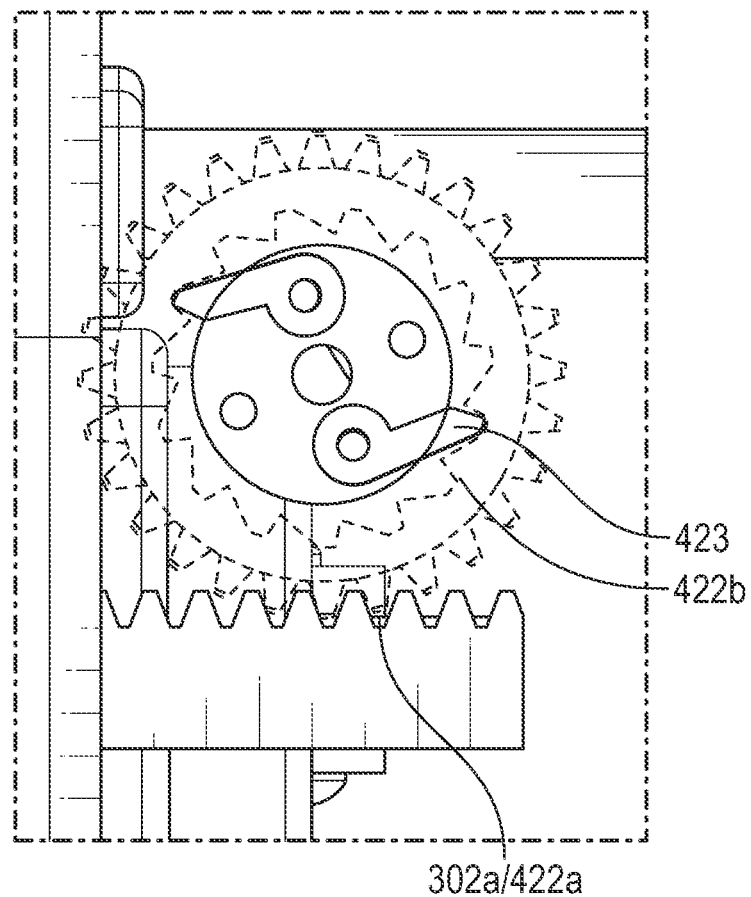

FIGS. 7A and 7B illustrate how freewheel assembly 420 allows pusher assembly 300 to be pushed inwardly when charging connector 120 is inserted into socket 113. In particular, when the user inserts charging connector 120, and assuming that pusher assembly 300 is not already retracted, charging connector 120 will contact recessed inner portions 301a of pushers 301. As charging connector 120 applies a rearward force on pushers 301, pawls 423 will pivot overtop inner teeth 422b thereby allowing outer component 422 to rotate relative to inner component 421. Accordingly, the interface between gear 302a and outer gear 422a will not oppose the rearward movement of shaft 302 as charging connector 120 is inserted into socket 113.

With pusher assemblies 300 in this retracted position while charging connector 120 is inserted into socket 113, the driver or other user will be able to eject charging connector 120 by simply activating motor 401. For example, while sitting in Tesla 100, the driver could push a button on the Tesla's display, a mobile application, a fob, etc. to eject charging connector 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. An ejector comprising:
   two pusher assemblies that are configured to push a connector from a socket; and
   two driver assemblies that are configured to force the two pusher assemblies against the connector to push the connector from the socket and to freely retract when the connector is inserted into the socket.

2. The ejector of claim 1, wherein each of the pusher assemblies includes a pusher and a shaft.

3. The ejector of claim 2, wherein the shaft forms a rack of a rack and pinion.

4. The ejector of claim 3, wherein each of the driver assemblies forms a pinion of the rack and pinion.

5. The ejector of claim 2, wherein the pusher extends through an opening in a housing that forms the socket.

6. The ejector of claim 1, wherein each of the driver assemblies includes a motor, a gear assembly, and a freewheel assembly.

7. The ejector of claim 6, wherein the freewheel assembly includes an inner component, an outer component, and one or more pawls, the one or more pawls allowing the outer component to rotate relative to the inner component to allow the corresponding pusher assembly to freely retract.

8. The ejector of claim 6, wherein the gear assembly includes a gear arrangement that is supported by a plate assembly.

9. The ejector of claim 8, wherein the gear arrangement includes a center gear component, a first side gear component, and a second side gear component.

10. The ejector of claim 9, wherein the plate assembly includes a first plate, a second plate, and a third plate.

11. An ejector for a charging port of an electric vehicle comprising:
    a housing that is configured to be secured around a socket of the charging port;
    one or more pusher assemblies that are supported by the housing, each of the one or more pusher assemblies including a pusher and a shaft, the pusher being configured to extend through an opening within the socket of the charging port; and
    one or more driver assemblies that are coupled to the one or more pusher assemblies, each of the one or more driver assemblies including a freewheel assembly that forces the pusher through the opening within the socket;
    wherein the freewheel assembly forms a pinion and the shaft forms a rack.

12. The ejector of claim 11, wherein the freewheel assembly allows the pusher to be freely retracted when a charging connector is inserted into the socket.

13. The ejector of claim 11, further comprising:
    circuitry for receiving a signal and, in response to receiving the signal, causing each of the one or more driver assemblies to force the respective pusher through the opening within the socket.

14. The ejector of claim 13, wherein the signal is received via a wired connection or a wireless connection.

15. An ejector for a charging port of an electric vehicle, the charging port having an internal housing which forms a socket for receiving a charging connector for charging the electric vehicle, the ejector comprising:
    a housing that couples to the internal housing of the charging port around the socket;
    a pusher assembly that is supported by the housing, the pusher assembly being configured to selectively extend through an opening that is formed through the internal housing and within the socket of the charging port; and
    a driver assembly that is coupled to the pusher assembly and also supported by the housing. the driver assembly being configured to force the pusher assembly through the opening in response to a signal, the driver assembly also being configured to allow the pusher assembly to be freely pushed into the opening when a charging connector is inserted into the socket.

16. The ejector of claim 15, wherein the driver assembly includes a freewheel assembly.

17. The ejector of claim 16, wherein the pusher assembly includes a shaft that forms a rack and the freewheel assembly forms a pinion.

18. The ejector of claim 15, further comprising:
    a second pusher assembly that is supported by the housing, the second pusher assembly being configured to selectively extend through a second opening that is formed through the internal housing and within the socket of the charging port; and
    a second driver assembly that is coupled to the second pusher assembly and also supported by the housing. the second driver assembly being configured to force the second pusher assembly through the second opening in response to the signal, the second driver assembly also being configured to allow the second pusher assembly to be freely pushed into the second opening when the charging connector is inserted into the socket.

* * * * *